United States Patent
Maurer et al.

[11] Patent Number: 6,035,956
[45] Date of Patent: Mar. 14, 2000

[54] OFFSET AXLE

[75] Inventors: Dieter Maurer; Werner Brysch, both of Passau; Klaus Alesch, Untergriesbach; Johann Amsl, Hauzenberg, all of Germany

[73] Assignee: ZF Friedrichshafen AG, Friedrichshafen, Germany

[21] Appl. No.: 09/091,962

[22] PCT Filed: Feb. 3, 1997

[86] PCT No.: PCT/EP97/00480

§ 371 Date: Jun. 26, 1998

§ 102(e) Date: Jun. 26, 1998

[87] PCT Pub. No.: WO97/28980

PCT Pub. Date: Aug. 14, 1997

[30] Foreign Application Priority Data

Feb. 9, 1996 [DE] Germany ............................ 196 04 730

[51] Int. Cl.$^7$ .......................... B60K 17/02; F16H 57/00; F16H 1/12

[52] U.S. Cl. .......................... 180/383; 74/410; 74/421 R; 74/606 R

[58] Field of Search .................................... 180/344, 383, 180/337; 74/410, 421 R, 606 R; 188/18 A, 73.32

[56] References Cited

U.S. PATENT DOCUMENTS

| | | | |
|---|---|---|---|
| 1,165,827 | 12/1915 | Alquist | 74/410 |
| 1,165,830 | 12/1915 | Alquist | 74/410 |
| 4,036,330 | 7/1977 | Henning et al. | 188/72.8 |
| 4,312,244 | 1/1982 | Barnes et al. | 74/410 |

FOREIGN PATENT DOCUMENTS

| | | | |
|---|---|---|---|
| 494697 | 9/1919 | France | 180/337 |
| 30 27 806 A1 | 2/1982 | Germany . | |
| 9716 | 4/1907 | United Kingdom | 74/421 R |
| 2 080 747 | 2/1982 | United Kingdom . | |

*Primary Examiner*—Brian L. Johnson
*Assistant Examiner*—Faye M. Fleming
*Attorney, Agent, or Firm*—Davis and Bujold

[57] ABSTRACT

An offset axle (1) for low-platform town buses. It solves the problem of making it possible to integrate disc brakes in the offset axle system without reducing the aisle width of the platform in the vehicle in the area of the axle and obtaining a sufficiently low platform level in spite of the gantry being significantly lowered owing to design requirements. Disposed eccentrically in the offset axle (1) is a differential (2) the axle shafts of which are each inserted into a drive pinion (5) of a gantry drive (3) with demultiplication effect, the drive being freely mounted in a self-centering manner between two intermediate pinions (6) each of which transmits half the drive power to a spur wheel (7) in order to drive the wheels. Owing to the two gantry drives (3), the axle shafts (4) are lower than the wheel axles by the depth of the gantry. The axle shafts (4) are mounted eccentrically on the upper edge of the interior of the axle bridge housing (8). They are adapted to a recess (9) of the axle bridge housing (8) so that the platform can be as low as possible. The disc brakes (10), integrated in the offset axle system, are actuated by a pneumatic cylinder (11), via a shift lever (12), the axis of the pneumatic cylinder (11) being placed within a given angular range radially to the brake disc axis.

4 Claims, 4 Drawing Sheets

FIG. 2 ③ GANTRY DRIVE

OFFSET AXLE

The invention relates to an offset axle.

BACKGROUND OF THE INVENTION

Offset axles are known already, one embodiment having been described in German Patent 30 27 806. In offset axles, the axle shafts are offset relative to the wheel axes by a specific distance, the so-called gantry height or depth. This offset is created by an intermediate gear, the so-called gantry drive, directly on the wheel drive. An upward axle offset makes greater vehicle ground clearance possible, and a downwards offset makes possible a lower platform level. In local-traffic or town buses, the lowest platform level is desirable in order to make it possible for the passengers to get on and off comfortably and easily. The passengers can enter the bus from the curb without having to climb perceptibly. This is a significant help, especially for wheelchair users or perambulators.

In German Patent 30 27 806 an offset axle for local-traffic buses is described. In the offset axle, a differential is eccentrically placed directly next to one of the two gantry drives. In that case, the differential requires space and the inner bulkhead of the vehicle must, therefore, be increased in this place. In order that the aisle on the lower platform level remains sufficiently wide, the differential must be lodged, as close as possible, to one of the wheel wells and thus also as close as possible to one of the gantry drives. The axle shafts of the differential are each inserted into a drive pinion of the gantry drive which is freely mounted in a self-centering manner directly between two intermediate pinions and in contact with them so that all three pinion axes lie in one plane. The intermediate pinions, in turn, mesh with a spur wheel for driving the wheels. The force of the meshing of teeth and the input are uniformly divided between the two intermediate pinions. This design of the offset axle is smooth running and compact in height and an axial expansion and thus allows a wider aisle in the platform and sufficient ground clearance despite a larger gantry depth. The gantry drive is greatly geared down in order that the maximum torque of the axle shafts and the size of the differential can be kept small. The axle shafts are in the center of axle bridge housing which, as a consequence of the needed power, has a cross section clearly larger than that of the axle shafts.

The offset axle described in German Patent 30 27 806 has the disadvantage that because of the space needed by the gantry drive, no commercially available disc brake can be integrated in the axle system without the platform height clearly and intolerably increasing as result of the necessary constructional change. In that case, the spur wheel has to be significantly reduced to drive the wheel to be able to locate the disc brake. The drive pinion must be equally reduced in order to maintain the reduction ratio. Thus the gantry depth diminishes and the platform level increases. Besides, as a result of the axial length of the brake cylinders, the aisle width of the platform further diminishes in the area of the axle of the vehicle.

SUMMARY OF THE INVENTION

The problem to be solved, by the invention, is to provide an offset axle which makes it possible to integrate disc brakes in the offset axle system and which, at the same time, without diminishing the aisle width of the platform in the vehicle in the area of the axle, despite the significantly reduced gantry depth due to design requirements, makes a sufficiently low platform level possible.

The problem, on which the invention is based, is solved by integrating the disc brakes into the offset axle system in a manner such that the appertaining brake cylinders are vertically and stationarily inserted in the narrow space between the gantry drive, the wheel rims, the tires and the body. The cylinder stroke, which then acts radially in relation to the brake discs, is a lever shifted to the brake discs. Despite a significantly reduced gantry level, due to the design requirements, a sufficiently low platform level is achieved by the axle shafts eccentrically lying in a recess adapting to the upper inner edge of the axle bridge housing. Thus, the distance between the bore axis of the axle shaft and the inner bulkhead of the vehicle and the platform level significantly decrease. The strength of the axle bridge is not impaired by this favorable design.

In an advantageous embodiment of the invention, the disc brakes are actuated by a pneumatic cylinder via a shift lever. The cylinder axis of the pneumatic cylinder is placed here radially, in relation to the brake disc axis, within a certain angular range. The angle between the pneumatic cylinder shaft and the brake disc shaft preferably amounts to between 80° and 100°, that is, the divergence from the radial installation is 0° to 10°, so that the pneumatic cylinder is housed precisely close to the inner side of the wheel rim and the tire and does not impair the space requirement of the offset axle.

Preferably, the drive pinion has 21 teeth and a module of 3.0; the intermediate pinion has 67 teeth and a module of 3.0 and the spur wheel has 67 teeth and a module of 3. The gantry height amounts to about 144 mm.

In another advantageous embodiment of the invention, the prop shaft is situated forming an 87° angle with the axle shaft. Thus the engine can be installed in the bus longitudinally in the rear, on one side, and thereby impairs the interior less.

BRIEF DESCRIPTION OF THE DRAWING(S)

In the drawings is shown an embodiment of the invention:

DESCRIPTION OF THE PREFERRED EMBODIMENT(S)

Figure 1:
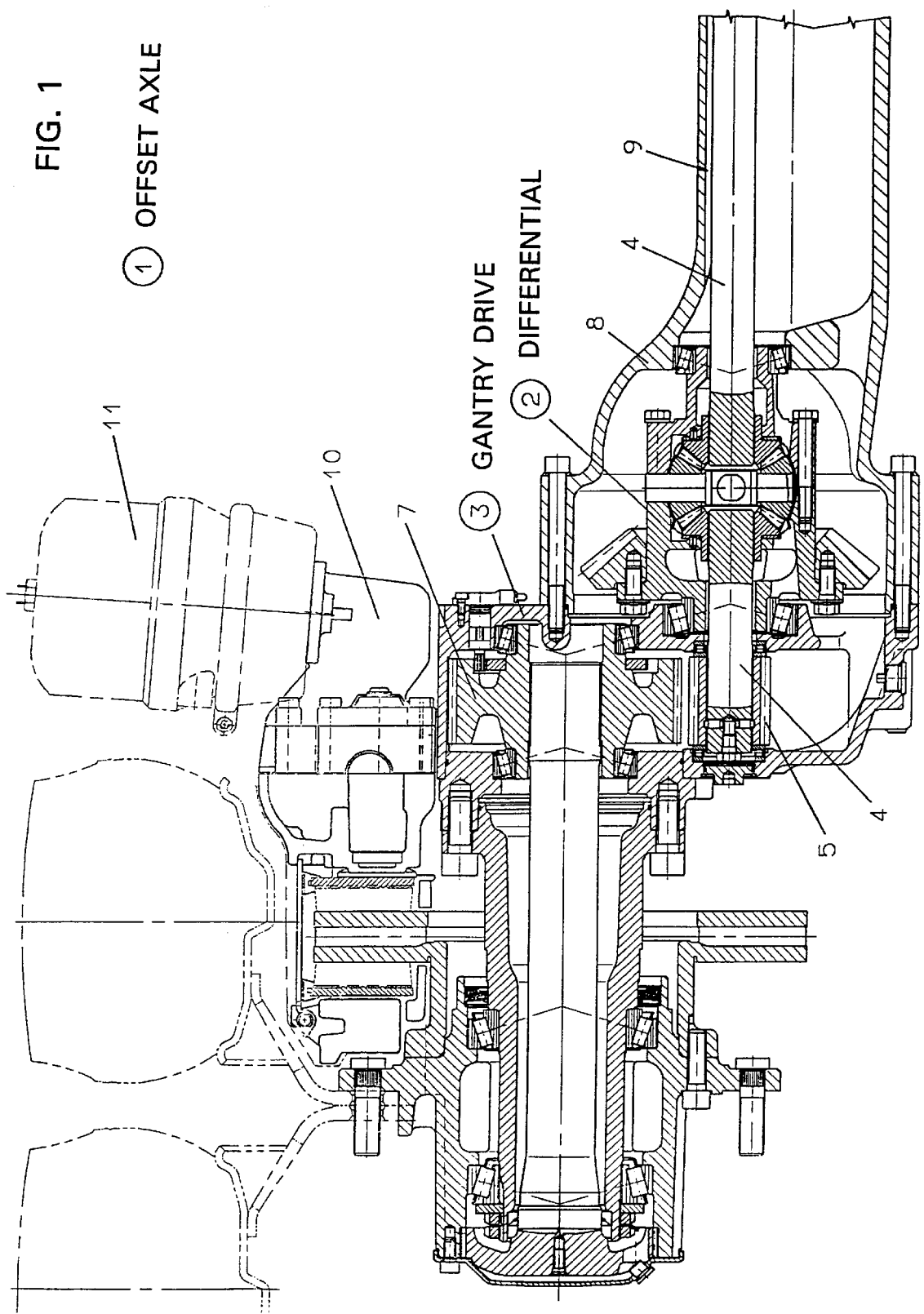
FIG. 1 is a section through an offset axle.
Figure 2:
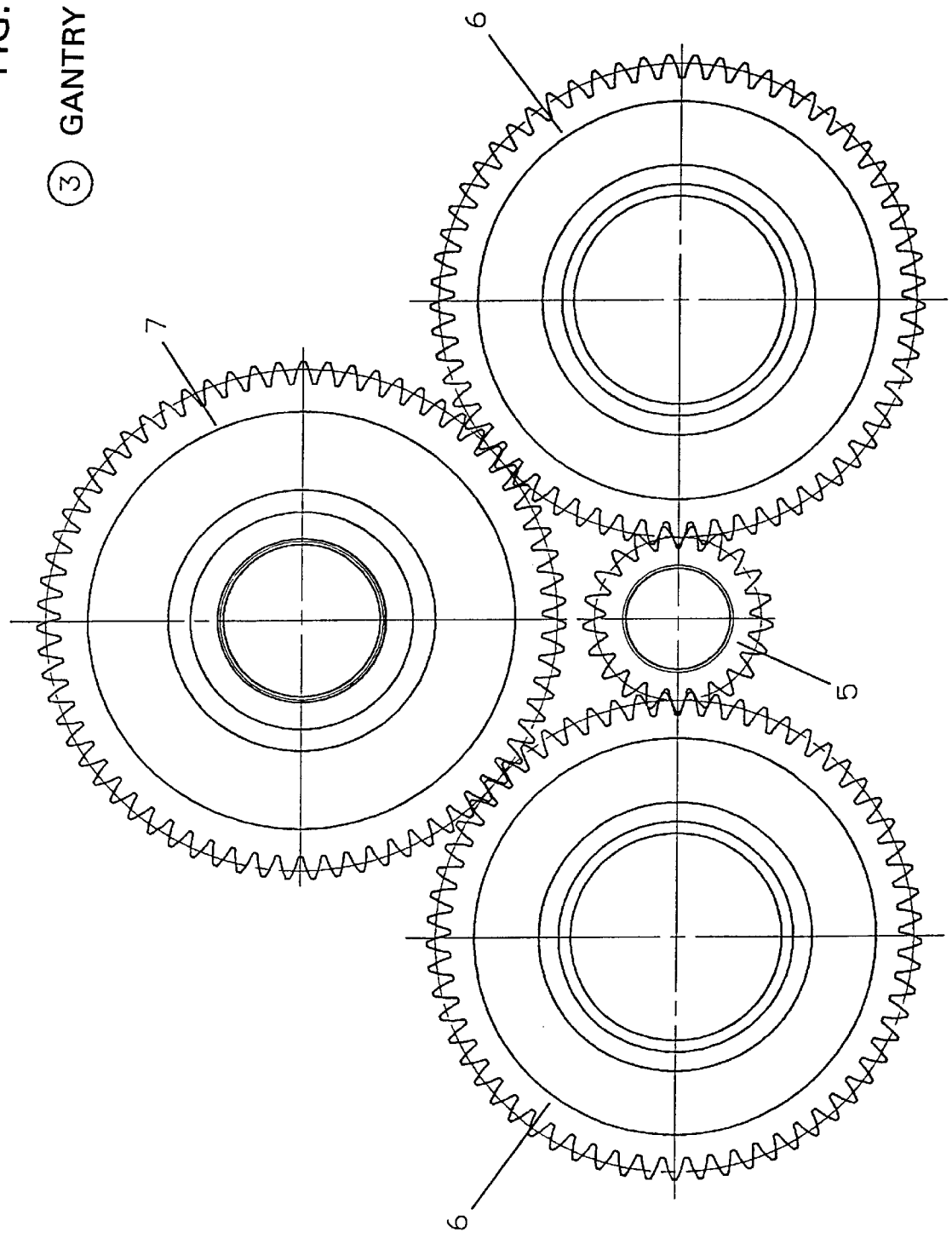
FIG. 2 is a section through a gantry drive.
Figure 3:
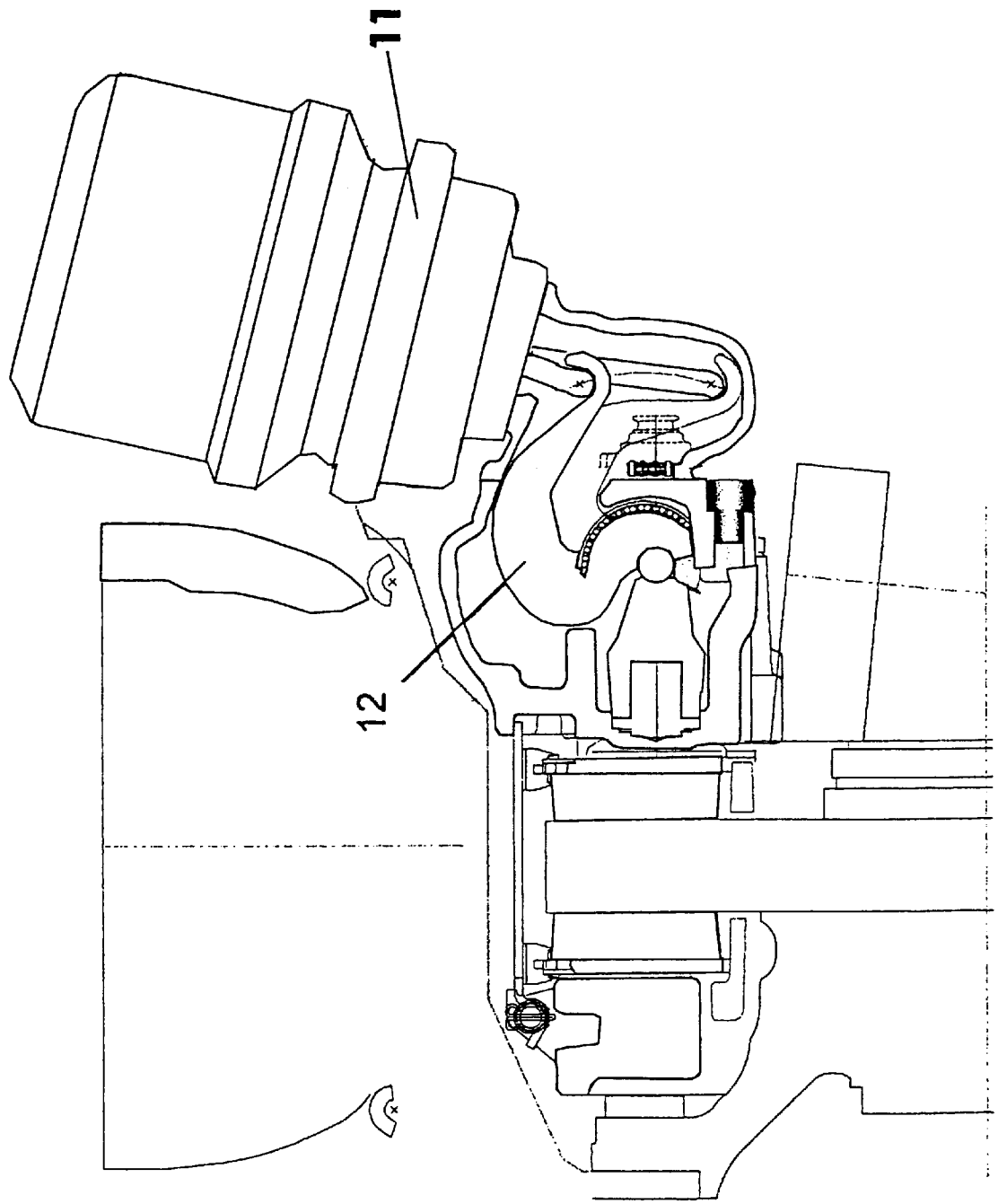
FIG. 3 is the arrangement of the disc brakes.
Figure 4:
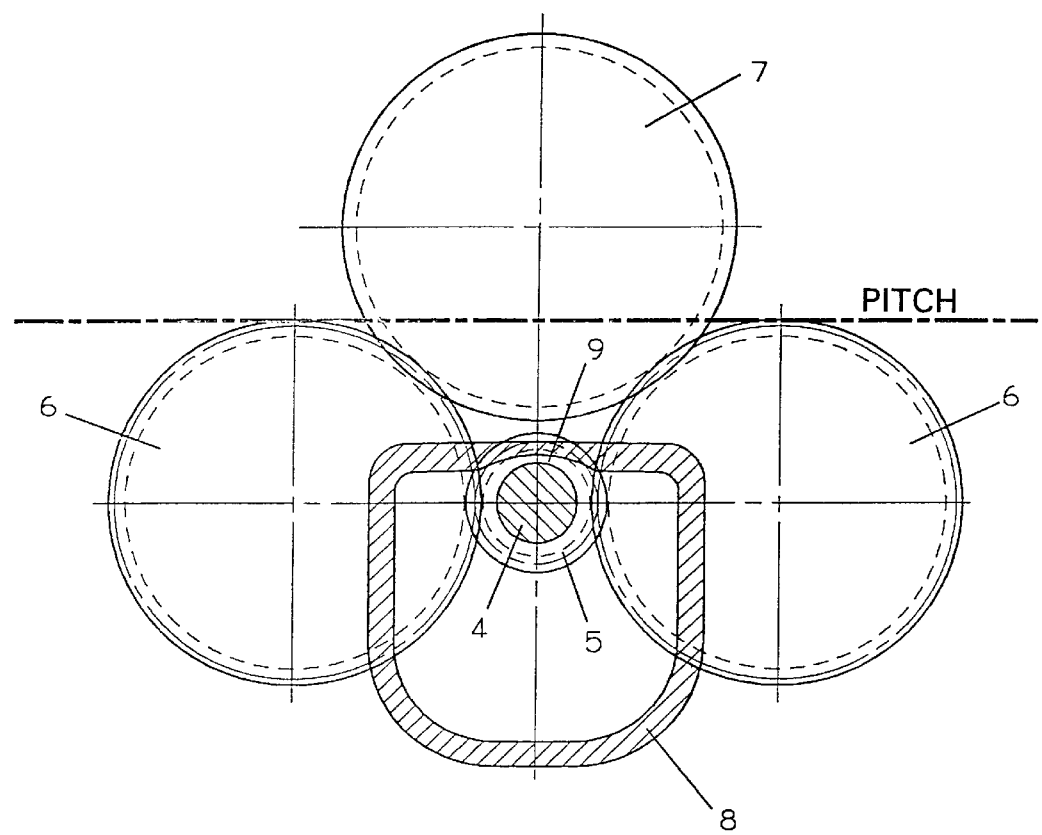
FIG. 4 is the axle shaft in the axle bridge housing.

In an offset axle 1, a differential 2 is eccentrically mounted directly close to one of the two gantry drives 3. The axle shafts 4 of the differential 2 are each inserted in a drive pinion 5 of a gantry drive 3, which freely floatingly and in a self-centering manner is mounted directly between two intermediate pinions 6 and in contact with them so that all three pinion axes are in one plane. The intermediate pinions 6, in turn, mesh with a spur wheel 7 for driving the wheel. The longer of the two axle shafts 4 is supported so as to lie eccentrically on the upper edge of the interior of the axle bridge housing 8. Internally, the axle bridge housing 8 has a recess 9, on its upper side, which the axle shaft 4 adapts so that it can be situated as high as possible relative to the axle bridge housing 8. The wheel drive is braked by disc brakes 10 which are actuated, via a shaft level 12, by pneumatic cylinders 11.

| Reference numerals | |
| --- | --- |
| 1 offset axle | 7 spur wheel |
| 2 differential | 8 axle bridge housing |
| 3 gantry drive | 9 recess |
| 4 axle shafts | 10 disc brakes |
| 5 drive pinion | 11 pneumatic cylinder |
| 6 intermediate pinion | 12 shift lever |

What is claimed is:

1. An offset axle (1) for a low-platform vehicle having a differential (2) with axle shafts (4) which are each inserted with a demultiplication effect in a drive pinion (5) of a gantry drive (3) which is placed freely and in a self-centering manner between two intermediate pinions (6), each intermediate pinion (6) transmits half the power to a spur wheel (7) to drive a wheel, and said axle shafts (4), owing to the two gantry drives (3), lying lower than the wheel axes by a depth of the gantry;

wherein disc brakes (10) are integrated in the offset axle system, appertaining brake cylinders are each inserted radially, within a given angular range, of the brake disc axis within a narrow space between said gantry drive (3), wheel rims and body, and the cylinder stroke being shifted by levers to said brake discs; and said axle shafts (4), eccentrically lying in a recess (9), adapt to the upper inner edge of the axle bridge housing (8).

2. The offset axle (1) according to claim 1, wherein said disc brakes (10) are actuated by a pneumatic cylinder (11) via a shift lever (12).

3. The offset axle (1) according to claim 1, wherein the drive pinion (5) has 21 teeth and a module of 3.0, the intermediate pinions (6) have 61 teeth and a module of 3.0 and the spur wheel (7) has 67 teeth and a module of 3, and the gantry height mounts to approximately 144 mm.

4. The offset axle (1) according to claim 1, wherein the prop shaft is situated forming an angle of 87° with said axle shaft (4).

* * * * *